3,697,441
METHOD FOR PREPARING STABLE ACTINIDE PEROXIDE SOLS
George S. Petit and Charles A. Kienberger, Oak Ridge, Tenn., assignors to the United States of America as represented by the United States Atomic Energy Commission
No Drawing. Filed Dec. 8, 1970, Ser. No. 96,237
Int. Cl. B01d 17/04
U.S. Cl. 252—301.1 S         11 Claims

ABSTRACT OF THE DISCLOSURE

A method for preparing stable actinide peroxide sols comprising precipitating the actinide as a peroxide from an acid solution at a pH of −0.5 to 1.5 and thereafter separating and suspending the actinide peroxide precipitate in water or a dilute hydrogen peroxide solution to form the actinide peroxide sol.

BACKGROUND OF THE INVENTION

The invention described herein was made in the course of, or under, a contract with the United States Atomic Energy Commission.

Our invention relates to methods of preparing stable actinide peroxide sols and more specifically to a method of preparing stable actinide peroxide sols from salt solutions of the actinide which contain rare earth and other metallic contaminants.

Actinide metal oxides, such as uranium dioxide and thorium dioxide, have many nuclear and physical properties which make them desirable as fissile and fertile materials for use in nuclear reactors. For example, these materials have high melting temperatures, are stable under radiation, and have good metal-to-oxide ratios. It has been heretofore recognized in the art that it is desirable to provide these metal oxide sols, either singly or as mixed sols in a form which is amenable to the preparation of either dense shards or dense microspheres for reactor fuel usage. The "sol-gel" process has been extensively demonstrated in the art as a suitable means for preparing actinide metal oxide aqueous sols of urania, thoria, urania-plutonia, etc. As originally conceived, highly dense metal oxide particles, such as thoria, were prepared by forming a stable metal oxide sol containing a critical proportion of nitrate ions, and thereafter evaporating the sol at a low temperature to produce gel fragments which were then calcined into high density final product. Alternatively, the metal oxide sol could be dispersed in a slightly water-soluble, immiscible organic liquid, such as 2-ethylhexanol, suspended therein until enough water was extracted to cause gelation and thereafter calcined into dense microspheres.

While a number of methods have been devised for preparing these metal oxide sols, a convenient method employed a precipitation-peptization technique; namely, an alkaline reagent, such as ammonia or ammonium hydroxide, was added to a suitable actinide salt solution, e.g., tetravalent uranium nitrate, and the hydrous oxide precipitate was washed and resuspended in a suitable medium to peptize the solid into a stable sol. The resulting sols, while of suitable utility, contained certain contaminants, such as aluminum, cadmium, copper, iron, cobalt, nickel, zirconium, etc.

As reprocessing of irradiated nuclear fuels becomes more prevalent, it is highly desirable to be able to utilize the effluent aqueous solutions from reprocessing plants as a convenient source of fissile and fertile materials. Unfortunately, the effluent solutions also contain rare earths as contaminants and heretofore required separate reprocessing to separate the desirable fissile and/or fertile material from the contaminants.

It is an object of our invention to provide a method for preparing stable actinide peroxide sols which are of high purity.

Another object of our invention is to provide a method for preparing stable actinide peroxide sols from aqueous actinide salt solutions which contain rare earth and other contaminants.

SUMMARY OF THE INVENTION

In accordance with our invention, stable actinide peroxide sols are prepared by precipitating the actinide as a peroxide from an acid solution at a pH of −0.5 to 1.5, and thereafter separating and suspending the actinide peroxide in water or a dilute hydrogen peroxide to form the stable actinide peroxide sol. In one embodiment of our invention a stable mixed thorium-uranium peroxide sol (13–87 mole percent) was prepared by our peroxide precipitation method at a pH of about 0.5. The mixed sol was quite stable and was of ultra-high purity, i.e., only trace concentrations of various elements were detected. The peroxide precipitation method also beneficially separated rare earth contaminants from the thorium-uranium and thus affords the use of a thorium-uranium salt solution effluent from a fuel reprocessing plant without a separate decontamination operation. Advantageously, our process will work using uranium in its high state of oxidation, i.e., hexavalent oxidation state, and thus eliminates the need of conducting the process steps under a non-oxidizing atmosphere. The stable actinide peroxide sols prepared by our invention are readily converted into suitable nuclear fuel forms by either drying to form gel shards or dispersing into droplets (in a suitable dehydration solvent) to form gel microspheres. The intermediate gel products are, in turn, easily converted into high density final products by sintering the gel product in a reducing atmosphere at an elevated temperature.

DESCRIPTION OF THE PREFERRED EMBODIMENT

While the method of this invention is broadly applicable to the preparation of stable actinide peroxide sols from any suitable soluble actinide metal salt in the +4 or higher valence state, the invention will be described with particular reference to the preparation of a thorium-uranium peroxide sol from a solution of uranium and thorium nitrate. Unlike previous precipitation-peptization sol-gel techniques, our invention may be carried out utilizing uranium in the hexavalent oxidation state and does not require a reduction to the tetravalent oxidation state prior to the precipitation operation. Without wishing to be bound by any rigid theory we postulate that the presence of the univalent oxygen (peroxide O$^-$) in the UO$_4$ probably is a factor which makes this colloidal suspension successful when other U$^{+6}$ compounds, UO$_3$ and UO$_2$ (NO$_3$)$_2$ with only divalent oxygen (O$^=$) will not produce a dense hard UO$_2$ as the end product.

Advantageously, we have found that formation of the peptizable solids as peroxides within a pH range of 0 to 1.0 separates the thorium-uranium from most metallic impurities, such as aluminum, copper, iron, nickel, etc., and also from the rare earths. This finding affords the use of effluent streams from reprocessing plants which contain thorium and uranium values but which are contaminated with the rare earth fission products.

The optimum condition for the successful practice of our invention is that the peroxide precipitation step be carried out at pH value between 0 and 1.0. Precipitation at a pH value greater than 2.0 will result in a slight contamination from metallic elements (e.g., iron) and rare earth elements; precipitation at a pH less than 0 results in some loss of uranium values. Precipitation at a pH range 0 to 1.0 provides some variability in the particle size of the product, with a pH of 0 giving small particle sizes.

The peroxide precipitation step may be effected by slowly adding a dilute hydrogen peroxide solution to a thorium nitrate-uranyl nitrate solution while stirring. While the hydrogen peroxide solution may vary over a range of concentrations, it is preferred that the precipitation be carried out with about a 10 percent hydrogen peroxide solution. The pH after precipitation is re-adjusted to 0.5 and the resultant thorium-uranium peroxides ($Th_2O_7$–$UO_4$) precipitate is separated from the mother liquor by conventional solid-liquid separation techniques, such as by filtration. It should be noted here that where the uranium is present in the tetravalent oxidation state (e.g., uranous nitrate) the resultant precipitate is $$Th_2O_7-U_2O_7$$

After separation the solid is washed with a dilute hydrogen peroxide solution, such as a 1 percent hydrogen peroxide solution, and dried. The pH in the hydrogen peroxide solution which is used to wash the solid should be maintained at a pH of about 0.5 during washing. The precipitate is then dried. A suitable temperature for this drying step is 100°–125° C.

The formation of the stable thorium-uranium peroxide sol is readily effected by resuspending the dried precipitate in a suitable volume of dilute hydrogen peroxide solution.

The stable mixed peroxide sol ($Th_2O_7$–$UO_4$) is readily converted into reactor fuels by conventional methods. For example, when dense thoria-urania shards are desired the stable peroxide sol is dried under controlled conditions to produce gel fragments. The drying temperature preferably is about 100°–150° C. The resulting dried gel fragments are then heated to a temperature of about 400° C. to convert the peroxide ($Th_2O_7$–$UO_4$) to the oxide ($ThO_2$–$UO_3$). This heating step preferably is conducted for about 1 hour. Thereafter, the product is converted to thoria-urano-uranic oxide ($ThO_2$–$U_3O_8$) by ignition at a temperature of about 850° C. for about 30 minutes. It will be noted here that up to this point no inert atmosphere is necessary. It is only when the thoria-urano-uranic oxide ($ThO_2$–$U_3O_8$) particles are finally converted to the dioxide, i.e., thoria-urania, that a particular atmosphere is necessary. In this step it is preferred that the particles are reduced to $UO_2$ in hydrogen at about 1500° C. for about 2 hours and then heated an additional 2 hours at 1750° C. in hydrogen to fully densify the particles. There is no reduction of the tetravalent thorium in this step.

Where thoria-urania microspheres are desired the stable thorium-uranium peroxide sol is slowly added to a rapidly agitated solution to disperse the sol into droplets. While the solution may comprise any convenient dehydration solvent a suitable solvent is isopropyl alcohol in methyl chloroform. To prevent droplet agglomeration a surface-active agent, such as "Span 80" (Sorbitan Monoleate, registered trademark of Atlas Powder Company, Wilmington, Del.) or a non-ionic surfactant, is preferably added to the solution. The dehydrated, spheroidized, thorium-uranium peroxide particles are then removed from the alcohol and methyl chloroform mixture and pre-fired at an intermediate temperature for a period of about 1 hour, followed by a final high temperature firing in a reducing atmosphere. A suitable intermediate temperature is about 850° C. and a final firing temperature is about 1750° C. A satisfactory atmosphere is hydrogen for the final reduction of the urano-uranic oxide ($U_3O_8$) to the uranium dioxide. The bulk or apparent density of the resulting thoria-urania microspheres is better than 90 percent of theoretical and the particle size distribution, after sieving through 100 mesh sieve, is in the range of 5 to 57 microns.

Having described the invention in a broad fashion the following examples are given to provide a more specific detailed procedure and technique in carrying out our invention.

EXAMPLE I

A stable thorium-uranium peroxide sol was prepared as follows. A solution of uranium and thorium nitrates was prepared by dissolving 100 grams of $UO_3$ and 28.3 grams $Th(NO_3)_2·4H_2O$ in 2 N nitric acid. The resulting solution was filtered to remove any undissolved material and the pH of the solution adjusted to 0.5. Precipitation was effected by slowly adding a 10 percent hydrogen peroxide solution to the uranium-thorium nitrate solution while stirring and the pH of the solution readjusted to 0.5. The resultant peroxide precipitate ($Th_2O_7$–$UO_4$) was then separated from the mother liquor by filtration, washed with 1 percent hydrogen peroxide solution and dried under heat lamps. The dried peroxide precipitate was formed into the stable peroxide sol by addition of 2.5 milliliters of 1 percent hydrogen peroxide solution per gram of dried $Th_2O_7$–$UO_4$.

The resulting thorium-uranium peroxide sol was formed into dense microspheres by slowly adding the sol to a rapidly agitated solution consisting of 400 milliliters of isopropyl alcohol in 1000 milliliters of methyl chloroform to form gel microspheres. Approximately 2 milliliters of "Span 80," a surface-active agent, was added to the mixture to aid in formation of the gel microspheres. The dehydrated gel microspheres ($Th_2O_7$–$UO_4$) were removed from the alcohol-chloroform mixture, dried under a heat lamp, sieved through a 100 mesh sieve (149 micron opening) and prefired at 850° C. for a period of 1 hour followed by final firing at 1750° C. for 2 hours in a hydrogen atmosphere. The bulk or apparent density of the resultant microspheres was better than 90 percent of theoretical as measured by helium density measurement, and the particle size distribution was in the range of 5 to 57 microns.

EXAMPLE II

Decontamination of thorium and uranium from fission products by peroxide precipitation was established as follows. A solution of thorium and uranium nitrates, prepared as described in Example I, was spiked with 3000 p.p.m. ytterbium (Yb). The peroxide precipitation procedure was carried out as described in Example I, the resulting peroxide precipitate washed and redissolved in 100 milliliters of 4 M nitric acid and reprecipitated after adjusting the pH to 0. The precipitate was analyzed spectrochemically and less than 100 p.p.m. ytterbium remained after the first precipitation. No ytterbium was detected in the peroxide precipitate after the second precipitation.

EXAMPLE III

A stable uranium peroxide sol was prepared by peptizing 112 grams of a $UO_4·4H_2O$ precipitate which was formed by dissolving 110 grams of uranyl nitrate in 2 N nitric acid and precipitating the uranium as in Example I. Peptization of the solid was effected by slowly adding, while stirring, ninety (90) ml. of distilled water to the $UO_4·4H_2O$. The resulting stable uranium peroxide sol, after setting overnight with no separation, was diluted with an additional 40 milliliters of distilled water to obtain a sol dilute enough for delivery by a pipette to an organic dehydration solution of 25 percent isopropyl alcohol and 75 percent methyl chloroform. Gel microspheres were formed by dispersing the sol in the dehydration solution and separating the solid particles from the solution by filtration. The resulting particles were then dried under a heat lamp and sieved through a 100 mesh (149 micron sieve opening). The resultant particles were heated in air at 400° C. for 1 hour to convert uranium peroxide ($UO_4$) to uranium trioxide ($UO_3$). The particles were then ignited at 850° C. for 30 minutes to convert the uranium trioxide to urano-uranic oxide ($U_3O_8$). No inert atmosphere was necessary through this operation. The urano-uranic oxide particles were finally heated in hydrogen at 1500° C. for 2 hours to convert the urano-uranic oxide particles to uranium dioxide, and then given an additional 2 hours ignition at 1750° C. in hydrogen to further densify the particles.

The $UO_2$ particles which were generally spherical were spectrochemically analyzed for 26 elements and the results are given in the table below.

TABLE.—SPECTROCHEMICAL ANALYSES OF DENSIFIED $UO_2$ PARTICLES

| Element | P.p.m. found on U basis | Limit of det. | Element | P.p.m. found on U basis | Limit of det. |
|---|---|---|---|---|---|
| Ag | (¹) | <1 | Ge | ---------- | <1 |
| Al | ---------- | 2 | In | ---------- | <3 |
| As | ---------- | <30 | Mg | 1 | <0.5 |
| Au | ---------- | <1 | Mn | ---------- | <1 |
| B | ---------- | <1 | Ni | 1 | <0.5 |
| Ba | ---------- | <10 | P | ---------- | <50 |
| Be | ---------- | <1 | Pb | ---------- | <3 |
| Bi | ---------- | <1 | Sb | ---------- | <15 |
| Cd | ---------- | <1 | Si | 2 | <1 |
| Co | ---------- | <1 | Sn | ---------- | <1 |
| Cr | ---------- | <2 | Ta | ² 25 | <1 |
| Cu | ---------- | <1 | W | ---------- | <1 |
| Fe | 2 | <1 | Zn | ---------- | <20 |

¹ Sought but not found.
² Tantalum contamination was picked up during the hydrogen reduction.

What is claimed is:

1. A method for preparing a stable actinide peroxide sol comprising the steps of precipitating said actinide as a peroxide from an acid solution at a pH of −0.5 to 1.5, separating the peroxide precipitate from the mother liquor, washing the separated precipitate with dilute hydrogen peroxide while maintaining said pH, and thereafter resuspending said peroxide in distilled water or dilute hydrogen peroxide to form said actinide sol.

2. The method of claim 1 wherein said actinide peroxide sol is a uranium peroxide sol, said uranium being in a +4 or higher valence state.

3. The method of claim 1 wherein said actinide peroxide sol comprises a thorium-uranium peroxide sol in a concentration range of 1 to 99 weight ratio thorium and 99 to 1 weight ratio uranium.

4. The method of claim 1 wherein said actinide peroxide is precipitated from an uranyl nitrate solution at a pH of about 0.5.

5. The method of claim 1 wherein said actinide peroxide is resuspended in distilled water or a 1 percent hydrogen peroxide solution.

6. A method for preparing a high purity stable uranium-thorium peroxide sol comprising the steps of co-precipitating said uranium-thorium peroxide sol from a thorium-uranium nitrate solution which contains rare earths and metallic contaminants at a pH of 0 to 1.0, separating the thorium-uranium peroxide precipitate from the mother liquor, said rare earths and metallic contaminants remaining in said mother liquor, washing the separated precipitate with dilute hydrogen peroxide while maintaining said pH, and thereafter resuspending said thorium-uranium peroxide in distilled water or dilute hydrocarbon peroxide to form said high purity sol.

7. The method according to claim 1 wherein the pH of said hydrogen peroxide used in said washing step is 0.5.

8. The method according to claim 1 wherein prior to said step of separating, the pH of the solution is adjusted to 0.5.

9. The method according to claim 1 wherein said actinide sol is formed by adding distilled water to the actinide peroxide and stirring.

10. The method according to claim 9 wherein said steps of adding and stirring are carried out at room temperature.

11. The method according to claim 1 wherein said acid solution is nitric acid.

References Cited

UNITED STATES PATENTS 3,408,304  10/1968  Kosiancic ---------- 252—301.1
2,852,336   9/1958  Seaborg et al. ---------- 23—329

OTHER REFERENCES

Alonso et al., Preparation of Uranium Dioxides. I. Precipitation of Uranium Peroxide, NSA. vol. 18, No. 18, ABS. No. 31423, p. 4221.

CARL D. QUARFORTH, Primary Examiner

R. L. TATE, Assistant Examiner

U.S. Cl. X.R.
23—328, 329, 336